(12) United States Patent
Eklund

(10) Patent No.: US 9,537,936 B2
(45) Date of Patent: Jan. 3, 2017

(54) JOINT PROCESSING

(75) Inventor: Carl Petter Engelbert Eklund, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 193 days.

(21) Appl. No.: 14/350,185

(22) PCT Filed: Oct. 7, 2011

(86) PCT No.: PCT/EP2011/067594
§ 371 (c)(1),
(2), (4) Date: Jun. 30, 2014

(87) PCT Pub. No.: WO2013/050084
PCT Pub. Date: Apr. 11, 2013

(65) Prior Publication Data
US 2014/0304318 A1    Oct. 9, 2014

(51) Int. Cl.
*G06F 15/16*    (2006.01)
*H04L 29/08*    (2006.01)
*H04W 88/08*    (2009.01)

(52) U.S. Cl.
CPC .............. *H04L 67/10* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 8,111,993 B2* | 2/2012 | Lowery | .............. | H04B 10/2513 398/147 |
| 8,112,001 B2* | 2/2012 | Lowery | .............. | H04B 10/2543 398/158 |
| 8,184,973 B2* | 5/2012 | Qian | ...................... | H04B 10/61 398/202 |
| 2009/0074415 A1* | 3/2009 | Xie | ...................... | H04B 10/671 398/79 |
| 2010/0021163 A1* | 1/2010 | Shieh | ..................... | H04B 10/60 398/65 |
| 2012/0002636 A1 | 1/2012 | Xiao et al. | ..................... | 370/329 |
| 2012/0020319 A1* | 1/2012 | Song | .................... | H04B 7/0632 370/330 |
| 2013/0170830 A1* | 7/2013 | Cho | ........................ | H04B 10/27 398/28 |

FOREIGN PATENT DOCUMENTS

EP          2182663 A1    5/2010
WO     WO2010105405 A1    9/2010

* cited by examiner

*Primary Examiner* — Thomas Dailey
(74) *Attorney, Agent, or Firm* — Harrington & Smith

(57) ABSTRACT

The invention relates to an apparatus including: at least one processing module and at least one auxiliary processing module, the at least one processing module and the at least one auxiliary processing module being coupled by at least one splitter, the at least one splitter configured to convey data to be processed to the at least one processing module and at least one auxiliary processing module simultaneously enough for providing coordinated multi-point processing of the data.

17 Claims, 2 Drawing Sheets

JOINT PROCESSING

FIELD

The invention relates to apparatuses, methods, a system, computer programs, computer program products and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Modern multimedia devices enable providing users with more services. The usage of multimedia services increases the demand for rapid data transfer which in turn requires investments in radio networks. This has brought cost-effective technologies and network and/or node architectures, which also support sustainable development, into the beam of light.

BRIEF DESCRIPTION

According to an aspect of the present invention, there is provided an apparatus comprising: at least one processing module and at least one auxiliary processing module, the at least one processing module and the at least one auxiliary processing module being coupled by at least one splitter, the at least one splitter configured to convey data to be processed to the at least one processing module and at least one auxiliary processing module simultaneously enough for providing coordinated multi-point processing of the data.

According to yet another aspect of the present invention, there is provided a method comprising: conveying data by a splitter to at least one processing module and at least one auxiliary processing module simultaneously enough for providing coordinated multi-point processing of the data.

According to yet another aspect of the present invention, there is provided an apparatus comprising: splitting means for conveying data to at least one processing module and at least one auxiliary processing module simultaneously enough for providing coordinated multi-point processing of the data.

According to yet another aspect of the present invention, there is provided a computer program embodied on a computer-readable storage medium, the computer program comprising program code for controlling a process to execute a process, the process comprising: conveying data by a splitter to at least one processing module and at least one auxiliary processing module simultaneously enough for providing coordinated multi-point processing of the data.

LIST OF DRAWINGS

Figure 1A:
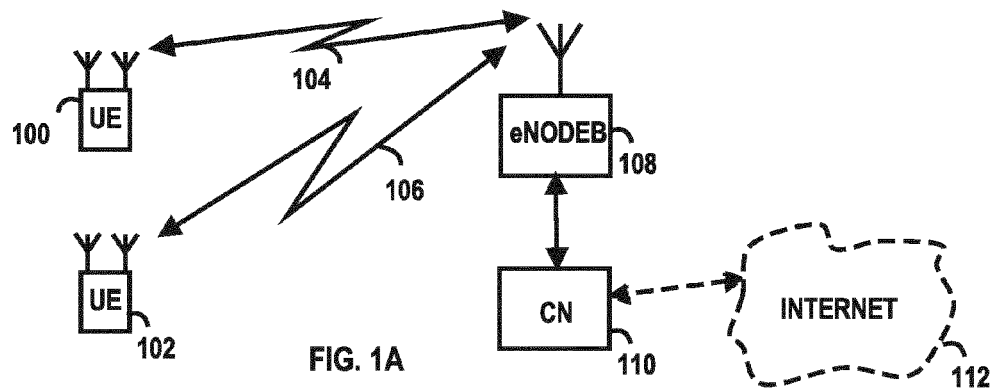
Figure 1B:
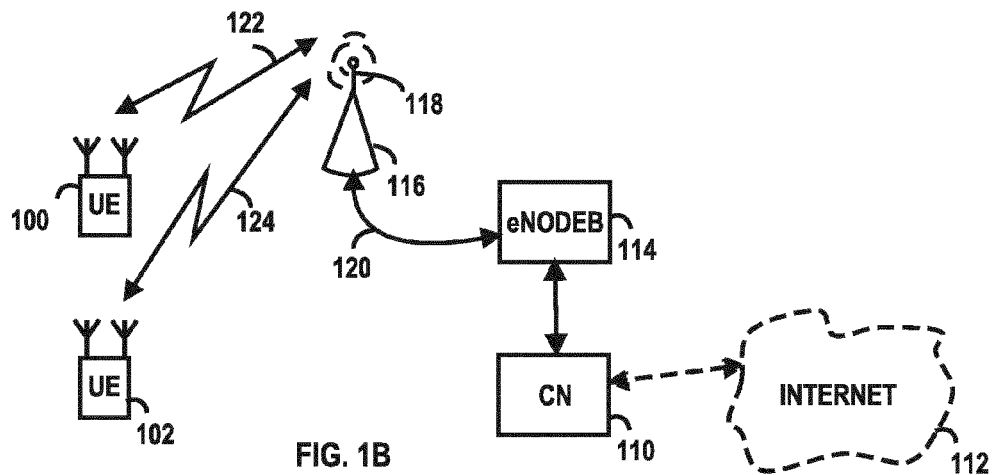
Figure 2:
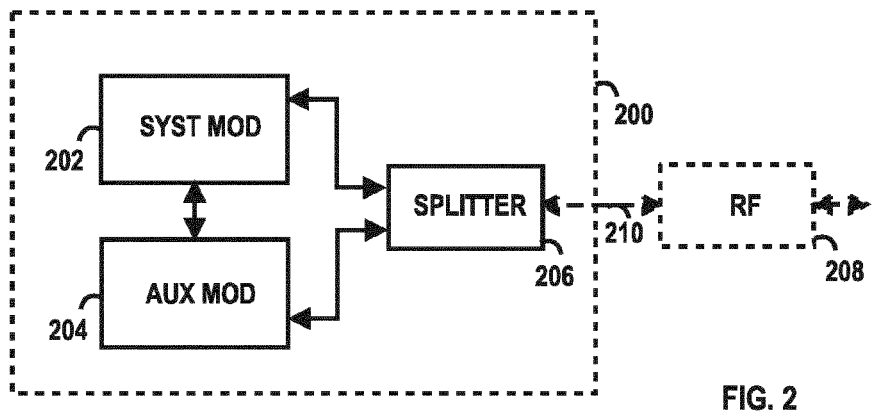
Figure 3:
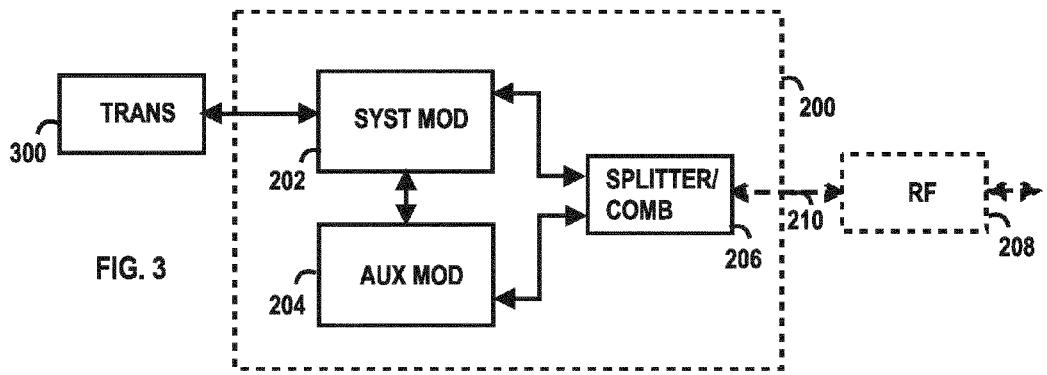
Figure 4:
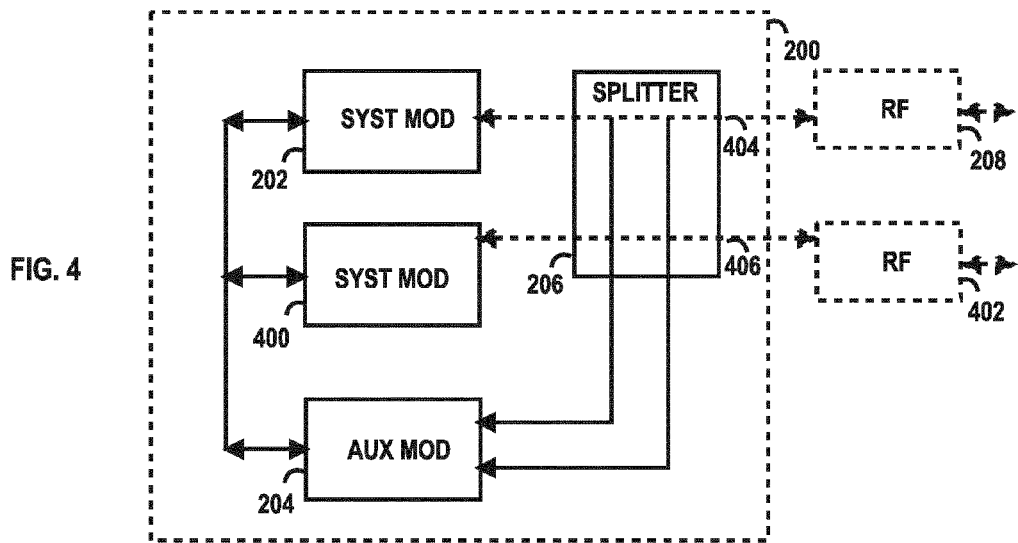
Figure 5:
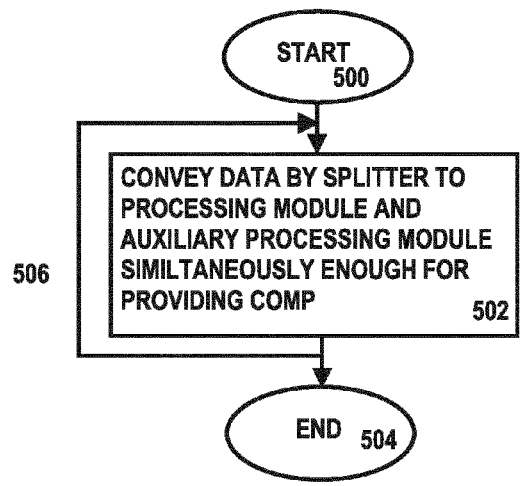

Some embodiments of the present invention are described below, by way of example only, with reference to the accompanying drawings, in which FIGS. 1A and 1B illustrate examples of systems;
FIG. 2 illustrates examples of apparatuses;
FIG. 3 illustrates other examples of apparatuses;
FIG. 4 illustrates yet other examples of apparatuses, and
FIG. 5 is a flow chart.

DESCRIPTION OF EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately.

In an orthogonal frequency division multiplexing (OFDM) system, the available spectrum is divided into multiple orthogonal sub-carriers. In OFDM systems, the available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB ("e" stands for evolved) needs to know channel quality of each user device and/or the preferred precoding matrices (and/or other multiple input-multiple output (MIMO) specific feedback information, such as channel quantization) over the allocated sub-bands to schedule transmissions to user devices. Such required information is usually signalled to the (e)NodeB.

FIG. 1A depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

FIG. 1A shows a part of a radio access network based on E-UTRA, LTE, LTE-Advanced (LTE-A) or LTE/EPC (EPC=evolved packet core, EPC is enhancement of packet switched technology to cope with faster data rates and growth of Internet protocol traffic). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1A shows user devices 100 and 102 configured to be in a wireless connection on one or more communication channels 104, 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to as a base station, an access point or any other type of interfacing device including a relay station capable of operating in a wireless environment.

The (e)NodeB includes transceivers, for example. From the transceivers of the (e)NodeB, a connection is provided to an antenna unit that establishes bi-directional radio links to user devices. The antenna unit may comprise a plurality of antennas or antenna elements. The (e)NodeB is further connected to core network 110 (CN). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

A communications system typically comprises more than one (e)NodeB in which case the (e)NodeBs may also be configured to communicate with one another over links, wired or wireless, designed for the purpose. These links may be used for signalling purposes.

The communication system is also able to communicate with other networks, such as a public switched telephone network or the Internet 112. The communication network may also be able to support the usage of cloud services. It should be appreciated that (e)NodeBs or their functionalities may be implemented by using any node, host, server or access point etc. entity suitable for such a usage.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1A, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e)NodeB 108 of FIG. 1A may provide any kind of these cells. A cellular radio system may be implemented as a multilayer network including several kinds of cells. Typically, in multilayer networks, one node B provides one kind of a cell or cells, and thus a plurality of node Bs are required to provide such a network structure.

Modern multimedia devices enable providing users with more services. The usage of multimedia services increases the demand for rapid data transfer which in turn requires investments in radio networks. Developed networks enabling an adequate user experience when modern services and applications are used, typically means higher installation and operating expenses (OPEX). Further, as the power consumption of a base station typically maps directly into the operational expenses (OPEX) of a network operator, technologies enabling reduction of energy consumption of a network have been a focus of interest.

One means to be used in improving the usage of network resources in a cost-effective way is introducing remote radio frequency (RF) heads and base station hotels or base band hotels. In this concept, a base station is split into two parts: a remote RF head and a baseband radio server typically coupled by a wired link (a wireless link is also possible). This produces a system wherein baseband radio servers may be deployed in an easy-to-access and/or low-cost location while remote radio frequency (RF) heads (RRHs) may be mounted on the rooftop close to an antenna. Usually, a remote RF head houses radio-related functions (transmitter RF, receiver RF, filtering etc.) and the base station part carries out other base station functions, such as base band functions. Each radio head may produce a separately controlled cell, but they may also constitute a cluster of cells with distributed antennas. Additionally, a set of remote radio heads may create a single cell.

Further, multiple baseband radio servers may be placed in a same location, utilizing same resources, such as power supplies and backhaul connections, while RF heads may be distributed at locations providing desired radio coverage. This concept is supported by open base station architecture initiative (OBSAI) specifications and/or common public radio interface (CPRI). The OBSAI is an initiative to create open interface specifications related to key parts of the base station subsystem and the CPRI is cooperation defining publicly available specification for the key internal interface of radio base stations between radio equipment control (REC) and radio equipment (RE). These initiatives are targeted to introduce a standardized split between base station elements, for instance between a base station's (eNB)

baseband unit and a remote radio head (RRH) which handle the conversion of a baseband signal to a desired radio carrier and vice versa. The centralized base station may be referred as a base station (BTS) hotel. Base station hotels or base band hotels with extensive integration and joint processing are also referred to as cloud RAN (C-RAN).

One advantage of the base station (BTS) or base band hotel architecture lies in its ability to provide cost-effective BTS redundancy.

FIG. 1B shows an example how the base station (BTS) or base band hotel concept may be implemented in the system of FIG. 1A. Similar reference numbers refer to similar units, elements, connections etc. Only differences between FIGS. 1A and 1B are explained in this context.

The base station (BTS) or base band hotel concept is taken herein only as an example. However, embodiments are not restricted to this concept. For example, the embodiments are applicable to networks, wherein nodes are coupled with optical fibre.

In FIG. 1B, a remote-site, such as a radio head 116 is placed near antenna 118 and the rest of the base station (in this example eNodeB) 114 is located in a centralized position which may be suitable for multiple base stations. In this example, the link between the radio head 116 and the base station 114 is implemented with an optical fibre connection 120. The eNodeB may include base band functions and thus be called as a base band hotel. The radio connections 122 and 124 between user devices 100 and 102 are provided by the remote-site 116.

In the following, some embodiments will be discussed in further details in relation to FIGS. 2, 3 and 4.

Signal samples after a digital front-end are usually transmitted over an interface between a remote radio head and a central processing unit of a base band or BTS hotel. That requires a plenty of capacity in the transmission path as well as in the central processing unit. Since the remote radio head and its central processing unit may be located at a distance from each other, costs usually play an important role and the reduction of a required data rate is an issue of interest.

In the current development of base station equipment, a tendency of introducing a plurality of interfaces in order to introduce a layered approach in terms of hardware architecture exists. Examples of such interfaces are common public radio interface (CPRI) and the open base station architecture initiative (OBSAI) as already stated above. Next generation interface for this split has already been discussed for standardization and is denoted OBRI/ORI that is to say open base band radio interface/open radio equipment interface or open base band unit (BBU) remote radio head (RRH) interface. The open BBU RRH interface is a project of the European telecommunications standards institute (ETSI) industry specification group (ISG).

A plurality of options for functionality split exists. The interface between a remote site and a hotel is denoted a mobile fronthaul (MFH). An option compatible with common public radio interface (CPRI) and open base station architecture initiative (OBSAI) specifications is that the remote site carries out only tasks of a currently specified remote radio head. This option typically requires a very fast fibre connection with strict timing requirements. Because of considerations of low cost transportation, a different split between the base band hotel and remote site may be considered as well. One possibility is that the remote site takes also care for layer 1 operations as a whole or even layer 2 operations (layers 1 and 2 refer to open systems interconnection model (OSI model) layers).

Another example of corresponding flexible architectures is a so-called liquid radio which enables sharing and redistributing available capacity based on user demand. According to the liquid radio, typically, radio frequency elements and antenna(s) become active, sized and positioned according to a need, while baseband processing is pooled and sited remotely. The baseband processing may be shared with several remote sites for capacity being dynamically used where needed.

An emerging technique, coordinated multipoint processing (CoMP), is considered to improve cell average and cell-edge spectral efficiency (SE). LTE CoMP is being developed for LTE Advanced. In principle, the coordinated multipoint processing is a method enabling transmitting to or receiving from a user device by using a plurality of eNodeBs. This is advantageous in terms of data throughput. The idea behind the CoMP is to turn inter-cell interference into a useful signal corresponding to diversity reception/transmission, especially at cell borders, where performance may normally be degraded. Coordinated multipoint processing requires coordination between a plurality of separated eNBs for providing at least partly joint scheduling and transmission/reception as well as joint signal processing. This coordination may be simple as in the techniques that focus on interference avoidance, or more complex as in the case of same data being transmitted from multiple cell sites, for example.

As CoMP typically utilized multiple-input-multiple output (MIMO) techniques, it increases the number of reception and/or transmission antennas and data streams correspondingly. Thus more computing resources are usually needed for baseband processing at a site. Hence, in many cases, computational resources residing at the site may be insufficient. Additionally, architecture of base band (BB) modules may be of that kind that they do not lend themselves well to communication of at least substantially large amounts of data with other modules, such as those ones providing radio connection.

Some embodiments of apparatuses are now explained by means of FIGS. 2, 3 and 4. The architectures shown are suitable for supporting base band hotel concept and liquid radio concept as well as to be used with common base stations or nodes providing network services. Additionally, these architectures are also applicable to cases wherein base band services are taken care as cloud services. The Figures should not be taken as limiting architectural concept in question, but as exemplary embodiments clarifying some implementation options.

It should be understood that conveying, transmitting and/or receiving may herein mean preparing a data conveyance, transmission and/or reception, preparing a message to be conveyed, transmitted and/or received, or physical transmission and/or reception itself, etc. on a case by case basis.

FIG. 2 illustrates a simplified block diagram of an apparatus according to an embodiment. The embodiment of FIG. 2 may be related to a base station, node, host, server, etc.

The embodiment of FIG. 2 depicts an apparatus 200 which comprises at least one processing module 202 and at least one auxiliary processing module 204, the at least one processing module and the at least one auxiliary processing module being coupled by at least one splitter 206, the at least one splitter configured to convey data to be processed to the at least one processing module and at least one auxiliary processing module simultaneously enough for providing coordinated multi-point processing of the data.

Typically, a processing module and/or an auxiliary processing module comprise one or more processors or control units, and they may have a connection to one or more memory units.

At least one splitter 206 may also comprise a combiner for downlink direction.

In an example, an auxiliary processing module (as well as a processing or system module) is applied to site, that is to an eNB, or to a base band hotel, etc. Furthermore, one or more splitters (typically optical) are placed in one or more routes and these one or more splitters are configured to convey data from radio frequency parts or modules, or radio heads. Route 210 may be implemented by, typically optical, fibers carrying for instance radio over fiber (RoF) transmission, such as a CPRI or OBSAI signal from a radio module or remote radio head (208; illustrated by using a dotted line, since it is not a part of the apparatus, when the apparatus is a base band module or a base band hotel) to system or processing modules and auxiliary processing modules performing base band processing of received signals. The route may be used only for uplink or downlink in which case another route for another direction may be provided, or it may be used for both uplink and downlink directions as shown in the Figure. The optical fibers may be common for both of the "normal" system or processing module and the auxiliary processing module, or they may be served by separate cables. Usually the target is that same received signals are visible to both type of modules simultaneously enough for coordinated multi-point processing (CoMP).

Radio over fiber refers to a technology wherein light is modulated by a radio signal and transmitted over an optical fiber link to provide wireless access. Radio over fiber technology (RoF) may thus be thought to be an integration of wireless and fiber optic networks. This technique is especially suitable to be used in connection with millimeter-wave radio.

Processing which may be taken care of cooperatively by at least one system or processing unit and at least one auxiliary processing unit may be at least one of the following: measurement data processing, hybrid automatic repeat request (Hybrid ARQ or HARQ) data processing, scheduling, synchronization, signalling data processing, payload data processing, etc.

Additionally, a scheduling function or module may be provided to determine which user device transmissions or data should be processed using CoMP algorithms, to indicate timing and channels (frequencies) used as well as antennas and signal processing parameters (such as modulation, coding) of these transmissions for an auxiliary processing module. It should be appreciated that the scheduling function may reside in either a system or processing module, auxiliary module or in both. The scheduling function may be implemented as software.

Processing load may thus be shared in such a manner that CoMP processing is carried out by one or more auxiliary modules while user device transmissions assigned to conventional reception may be processed by one or more system modules. It should be understood that all relevant antenna streams are usually available for the auxiliary module(s). Additionally, the auxiliary module(s) may comprise a transmission module, by means of which a transmission equipment upgrade may be carried out either at time of installation and/or at a later stage. The transmission module may take care of data processing for transmission. In the case the transmission module is located in the auxiliary processing module(s), the auxiliary processing module(s) may communicate with the system or processing module also directly or via another transmission module.

It should be understood that auxiliary processing modules and/or splitters may be used to enhance the processing capacity of an existing system almost "on the fly" due to the flexibility provided by decentralized nature of the architecture in question.

Another example of an apparatus comprises splitting means 204 for conveying data to at least one processing module and at least one auxiliary processing module simultaneously enough for providing coordinated multi-point processing of the data.

In the following, further examples of possible architectures are depicted based on FIG. 2. Similar elements have same reference numbers in FIGS. 2, 3 and 4 for the sake of clarity.

The FIG. 3 illustrates a simplified block diagram of an apparatus according to an embodiment. In FIG. 3, an embodiment with an additional transmission module 300 is shown. The transmission module takes care of data processing for transmission. The transmission module may also be integrated or located in an auxiliary module. The splitter 206 may also comprise a combiner.

The FIG. 4 illustrates a simplified block diagram of an apparatus according to an embodiment. In FIG. 4, an embodiment with a plurality of system or processing modules 202, 400 sharing a same auxiliary processing module 204 is illustrated. In this embodiment, also a plurality of radio modules or radio heads 208, 402 is also provided in such a manner that each radio module or radio head has a system or processing module, respectively. In the embodiment, one common splitter 206 is provided for enabling efficient traffic control. It should be appreciated that the number of system modules varies on the case by case basis and is not, naturally, limited to two. In this example, route 210 is divided into two, one route per each processing or system module, namely to routes 404 and 406. It should be understood that the routes may also serve one direction only corresponding to FIGS. 2 and 3. The splitter 206 may also comprise a combiner.

Although the apparatuses have been depicted as one entity in FIGS. 2, 3 and 4, different modules and memory may be implemented in one or more physical or logical entities.

It should be appreciated that embodiment features of FIGS. 2, 3 and 4 may also be combined in different ways.

An example of an apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be a software application, or a module, or a unit configured as arithmetic operation, or as a program (including an added or updated software routine), executed by an operation processor. Programs, also called program products or computer programs, including software routines, applets and macros, may be stored in any apparatus-readable data storage medium and they include program instructions to perform particular tasks. Computer programs may be coded by a programming language, which may be a high-level programming language, such as objective-C, C, C++, C#, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An embodiment of a method for providing CoMP-functionality starts in block 500. The embodiment is especially suitable for supporting base band hotel or liquid radio concepts.

In block 502, data is conveyed by a splitter to at least one processing module and at least one auxiliary processing module simultaneously enough for providing coordinated multi-point processing of the data It should be understood that conveying, transmitting and/or receiving may herein mean preparing a data conveyance, transmission and/or reception, preparing a message to be conveyed, transmitted and/or received, or physical transmission and/or reception itself, etc. on a case by case basis.

The embodiment ends in block 504. The embodiment is repeatable in many ways. One example is shown by arrow 506 in FIG. 5.

The steps/points, signaling messages and related functions described above in FIG. 5 are in no absolute chronological order, and some of the steps/points may be performed simultaneously or in an order differing from the given one. Other functions may also be executed between the steps/points or within the steps/points and other signaling messages sent between the illustrated messages. Some of the steps/points or part of the steps/points can also be left out or replaced by a corresponding step/point or part of the step/point.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
at least one processing module comprising one or more processors and at least one auxiliary processing module comprising one or more processors, the at least one processing module and the at least one auxiliary processing module being coupled by at least one splitter, the at least one splitter configured to convey data to be processed to the at least one processing module and at least one auxiliary processing module simultaneously enough for providing coordinated multi-point processing of the data;
the apparatus further comprising at least one scheduling module configured to determine which user device data is processed by the coordinated multi-point processing, and to indicate for the at least auxiliary processing module at least timing, channels, antennas and signal processing parameters used.

2. The apparatus of claim 1, wherein the at least one processing module and the at least one auxiliary processing module are located in base band parts.

3. The apparatus of claim 1, wherein the at least one splitter is placed in at least one route configured to convey the data to be processed from radio frequency parts or radio heads.

4. The apparatus of claim 3, wherein the at least one route is an implemented by at least one optical fiber.

5. The apparatus of claim 1, wherein data to be processed by the coordinated multi-point processing is at least: measurement data processing, hybrid automatic repeat request data processing, scheduling, synchronization, signalling data processing and payload data processing.

6. The apparatus of claim 1, further comprising:
at least one transmission module located in the at least one auxiliary module, the at least one transmission module configured to carry out data processing for transmission.

7. The apparatus of claim 1, the apparatus comprising host, base band hotel, node or server.

8. A method comprising:
conveying data by a splitter to at least one processing module and at least one auxiliary processing module simultaneously enough for providing coordinated multi-point processing of the data;
determining which user device data is processed by the coordinated multi-point processing by at least one scheduling module, and
indicating for the at least auxiliary processing module at least timing, channels, antennas and signal processing parameters used.

9. The method of claim 8, wherein the at least one processing module and the at least one auxiliary processing module comprise at least one processor.

10. The method of claim 8, wherein the at least one processing module and the at least one auxiliary processing module are located in base band parts.

11. The method of claim 8, wherein the at least one splitter is placed in at least one route configured to convey the data to be processed from radio frequency parts or radio heads.

12. The method of claim 11, wherein the at least one route is an implemented by at least one optical fiber.

13. The method of claim 8, wherein data to be processed by the coordinated multi-point processing is at least: measurement data processing, hybrid automatic repeat request data processing, scheduling, synchronization, signalling data processing and payload data processing.

14. The method of claim 8, further comprising: carrying out data processing for transmission by at least one transmission module located in the at least one auxiliary module.

15. A non-transitory computer-readable memory on which is stored a computer program comprising program code for controlling a process to execute a process, the process comprising:
conveying data by a splitter to at least one processing module and at least one auxiliary processing module simultaneously enough for providing coordinated multi-point processing of the data
determining which user device data is processed by the coordinated multi-point processing by at least one scheduling module, and
indicating for the at least auxiliary processing module at least timing, channels, antennas and signal processing parameters used.

16. The non-transitory computer-readable memory of claim 15, wherein the at least one splitter is placed in at least one route configured to convey the data to be processed from radio frequency parts or radio heads.

17. The non-transitory computer-readable memory of claim 16, wherein the at least one route is an implemented by at least one optical fiber.

* * * * *